US006134797A

United States Patent [19]

Boyce

[11] Patent Number: 6,134,797

[45] Date of Patent: Oct. 24, 2000

[54] DEVICE AND METHOD TO DEFINE ANGLES ON A WORKPIECE

[76] Inventor: Timothy C. Boyce, 2821 Girard Ave. South, Minneapolis, Minn. 55408

[21] Appl. No.: 09/132,729

[22] Filed: Aug. 12, 1998

[51] Int. Cl.[7] .............................. G01B 3/08; G01B 3/56; G01B 5/24; B43L 7/10

[52] U.S. Cl. ................................ 33/464; 33/427; 33/494

[58] Field of Search ............................... 33/464, 16, 415, 33/416, 417, 423, 427, 452, 483, 484, 494, 1 N, 534, 536, 420, 1 C, 1 D, 1 BB, 41.1, 41.6, 430, 443

[56] References Cited

U.S. PATENT DOCUMENTS

| | | | |
|---|---|---|---|
| 302,767 | 7/1884 | Olson et al. | 33/420 |
| 3,289,305 | 12/1966 | Norton . | |
| 4,047,304 | 9/1977 | Delre, Jr. | 33/443 |
| 4,281,572 | 8/1981 | Stovall | 33/443 |
| 4,462,166 | 7/1984 | Furlong | 33/416 |
| 4,712,307 | 12/1987 | Kish | 33/421 |
| 4,916,822 | 4/1990 | Johnson | 33/458 |
| 5,440,818 | 8/1995 | Mailhot | 33/464 |
| 5,539,991 | 7/1996 | Harrison | 33/471 |

FOREIGN PATENT DOCUMENTS

| | | | |
|---|---|---|---|
| 279681 | 11/1927 | United Kingdom | 33/420 |

*Primary Examiner*—Christopher W. Fulton
*Attorney, Agent, or Firm*—Patterson, Thuente & Skaar, P.A.

[57] ABSTRACT

A device for laying out an angle to form a borderpiece for a roof from a standard workpiece. The device includes first and second members, contact elements extending from each member. The contact elements contact opposing edges when the device is disposed on the workpiece. An edge of each first and second element defines the angle at which the workpiece is to be cut.

12 Claims, 5 Drawing Sheets

DEVICE AND METHOD TO DEFINE ANGLES ON A WORKPIECE

BACKGROUND OF THE INVENTION

1. Field of the Invention

The present invention relates to construction tools; and, in particular, the present invention relates to devices which enable precise angled cuts in roofing materials.

2. Description of Related Art

When building or replacing roofs on houses and similar buildings, sheets of roof decking are placed over structural members such as truss chords. The decking is typically standard-sized outdoor grade plywood. In many roof designs, end pieces are easily formed from the standard-sized decking by simply measuring and cutting the sheets to fit. However, in roofs such as hip roofs, each borderpiece formed to be placed proximate a hip rafter must be premeasured, then angularly cut to ensure a fit. This procedure is inefficient and time-consuming.

A rafter-measuring tape is disclosed in U.S. Pat. No. 3,289,305. The rafter-measuring tape includes a series of arced cutting marks. Graduations present on the slide surface cooperate with the cutting marks to enable rafters to be cut for various roof pitches. However, the rafter-measuring tape contains no guidance for forming angular borderpieces from standard-sized decking.

U.S. Pat. No. 4,462,166 discloses a device for measuring links and conforming angles. The device includes a telescoping measuring rafter gauge. The rafter gauge includes two telescoping members with locking devices. The device further includes two sliding pitch locating plates, each with a tightening device. The pitch locating plates fit flush against a center ridge board or hip rafter. Graduations are present along the telescoping inner member of the rafter gauge. Hinge means are provided on the telescoping outer rafter for attachment to the center ridge board. The device of U.S. Pat. No. 4,462,166 fails to disclose or suggest how it may be used to form borderpieces with angular edges.

U.S. Pat. No. 4,712,307 discloses a rafter angle measuring device. The device includes a body in the form of a generally U-shaped plate of metal with a horizontal base and spaced first and second vertical arms at opposite ends of the horizontal base. A third arm is pivotally connected to the plate proximate the end of the base bearing the first arm. The third arm extends beyond the second arm. The third arm receives and is releasably securable to one or both of the first and second arms in any position between the horizontal and vertical. The first arm has a generally triangular support portion secured to the base about half-way along the length thereof. The first arm defines a spaced pair of curved slots with angled hip rafter valve and common jack plumb cut indicia disposed along the perimeter of the slots. The support portion displays door sill and window sill indicia. At least one margin of each of the three arms and the base display linear indicia in fractions of an inch. The third arm has a bubble level in a cage. The bubble level is releasable from all major angles. The base is adapted to measure roof rafter angles and also serves as a U-square. The device of U.S. Pat. No. 4,712,307 also fails to suggest or disclose how one would form borderpieces with angular edges.

U.S. Pat. No. 4,916,822 discloses an angle- and distance-measuring instrument. The instrument provides two straight arms connected at one end for relative pivotal movement. A telescoping assembly has two elongated telescoping members, each member with a free end. The free end of one telescoping member is pivotally connected to one arm, and the free end of the other telescoping member is connected to the other arm. The telescoping members provide scales indicating the angular position between the two arms. The distance between the pivots of the free ends of the telescoping members and a correction for measurement along the ends of the arms establish distances from the corner being measured. The two arms can pivot 360° relative to each other and permit the measurement of inside and outside corners. A straight edge is removably mounted on one of the arms when measuring outside corners. A level is provided to establish the position of one of the arms relative to a horizontal direction. This instrument would be impractical in defining a borderpiece with angular edges, as well.

U.S. Pat. No. 5,539,991 discloses an adjustable sheathing square. The adjustable sheathing square scribes cut lines on large, flat panels. The device has a straight, flat, rectangular bar which serves as a base member. An angularly-adjustable arm is pivotally connected at one end to the base member. The adjustable pivot arm also includes a straight, flat, rectangular bar with an arcuate extension where the pivot arm is connected to the base member. The arcuate extension extends through a slot in the base member and is marked in degrees to form a quarter-circle protractor integral with the pivot arm. The protractor defines an arcuate groove, which is parallel with the outer edge of the arcuate extension. An adjustable stop extends through the groove and through the base member. The arcuate extension is pivoted on a pin affixed at the end of the base member. Releasing the adjustable stop permits the pivot arm to be angled relative to the base member to the desired degree, as indicated on the protractor. While potentially useful in forming decking borderpieces, the angles must be premeasured before the device can be used. Thus, there is a need for a device which enables borderpieces to be formed without either premeasuring or predetermining angles or using tables or formulae.

Thus, while several devices can measure and delineate cuts to be made when rafters are formed, there are relatively few devices for forming borderpieces from standard-sized sheathing.

SUMMARY OF THE INVENTION

There is provided a device for laying out an angle on a generally planar surface of a standard workpiece, the angle extending from a first edge of the workpiece such that the workpiece corresponds to a geometry or a borderpiece on a roof. The workpiece is cut along the angle. The device includes a first member displaying a scribing edge and a contact assembly which cooperates with the first member such that opposing first and second edges of the workpiece are contacted by the contact assembly, thereby disposing the scribing edge to define the angle.

The device may further include a second member in sliding contact with the first member. The first and second members may cooperate to display the scribing edge. The contact assembly may include a contact element extending from a lower surface of each of the first and second members. The device may include first and second indicia sets present on the respective first and second members. A first indicium from the first indicia set may align with a first indicium from the second indicia set to define a first distance between the contact elements. A second indicium from the first indicia set may align with a second indicium from the second indicia set to define a second distance between the contact elements. The first and second distances may correspond to respective first and second roof pitches. The second member may define a slot. The indicia present on the second member may be disposed proximate the slot. The first and second indicia present on the first member may be disposed so as to be viewable through the slot.

The device may further include a locking assembly. The locking assembly may reversibly lock the first and second members into respective first and second positions. The locking mechanism may include a threaded portion disposable in the first member and extendible through the slot. The contact assembly may include first and second contacting members. The first contacting member may be disposed proximate a first end of the first member. The second member may be adjustably disposed in the first member. Indicia may be present on the surface of the first member. The second contacting member may be slidably disposed in at least one slot defined in the first member. A surface of the second contacting member may align with the indicia to indicate first and second positions in which the angle is adjusted to conform to respective first and second pitches. The second member may further define a slot. The indicia present on the second member disposed proximate the slot and the first and second indicia present on the first member may be disposed so as to be viewable through the slot.

There is also provided a method of defining and forming a borderpiece from a standard workpiece, the method using a device for laying out an angle on a generally planar surface of the workpiece. In this method, the device may include first and second members in a locking mechanism. The first and second members may be in a sliding and adjustable relation. The first and second members may cooperate to display a generally linear scribing edge and may include contacting elements extending from lower surfaces. The first and second members may be adjustable to a first position by aligning an indicium on the first member with an indicium on the second member. The first and second members may be adjustable to a second position by aligning the indicium on the first member with another indicium on the second member. The first and second members may be reversibly locked into the first and second positions by operating the locking mechanism. The method may include the steps of:

- providing the above-described device;
- adjusting the device to the first position;
- contacting the contacting elements on the first and second members to opposite and respective first and second edges of the workpiece; and
- scribing a line on a surface of the workpiece proximate the scribing edge.

The method may further include cutting the workpiece along the scribed line, thereby forming the borderpiece for a roof with a first pitch.

The method may also include adjusting the device to the second position, thereby forming the borderpiece for a roof with a second pitch. The first and second scribing edges may be displayed by the device, and the line may be scribed on the surface of the workpiece proximate the first scribing line. The method may include forming a borderpiece for a hip roof or a gable roof.

DETAILED DESCRIPTION

Figures 1, 2, 3A:
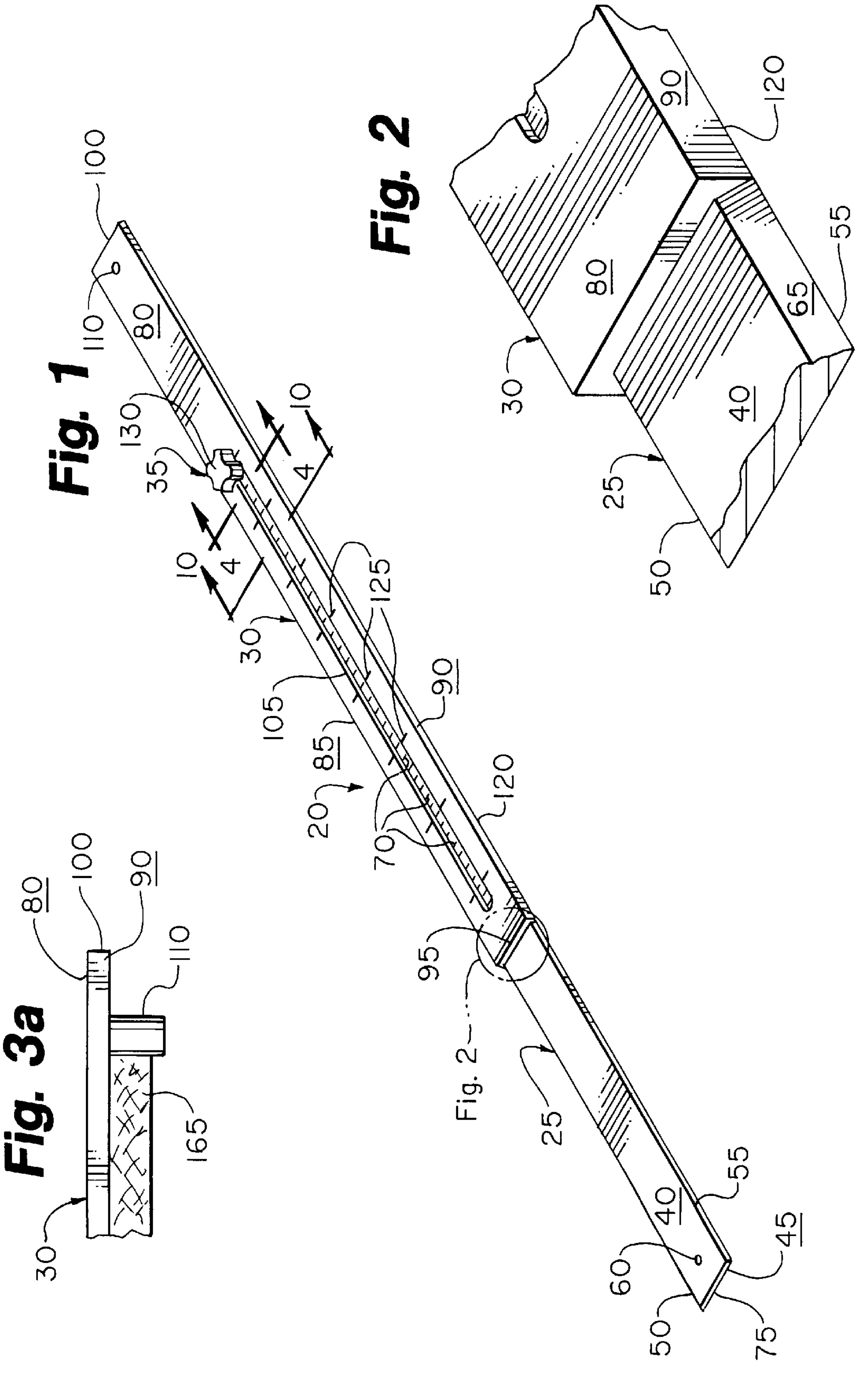
FIG. 1 is a perspective view of a device for laying out an angle on a generally planar surface of a standard workpiece.
FIG. 2 is a fragmentary view of the indicated portion of FIG. 1.
FIG. 3*a* is a fragmentary side view taken along line 3*a*—3*a* of FIG. 3.
Figure 3:
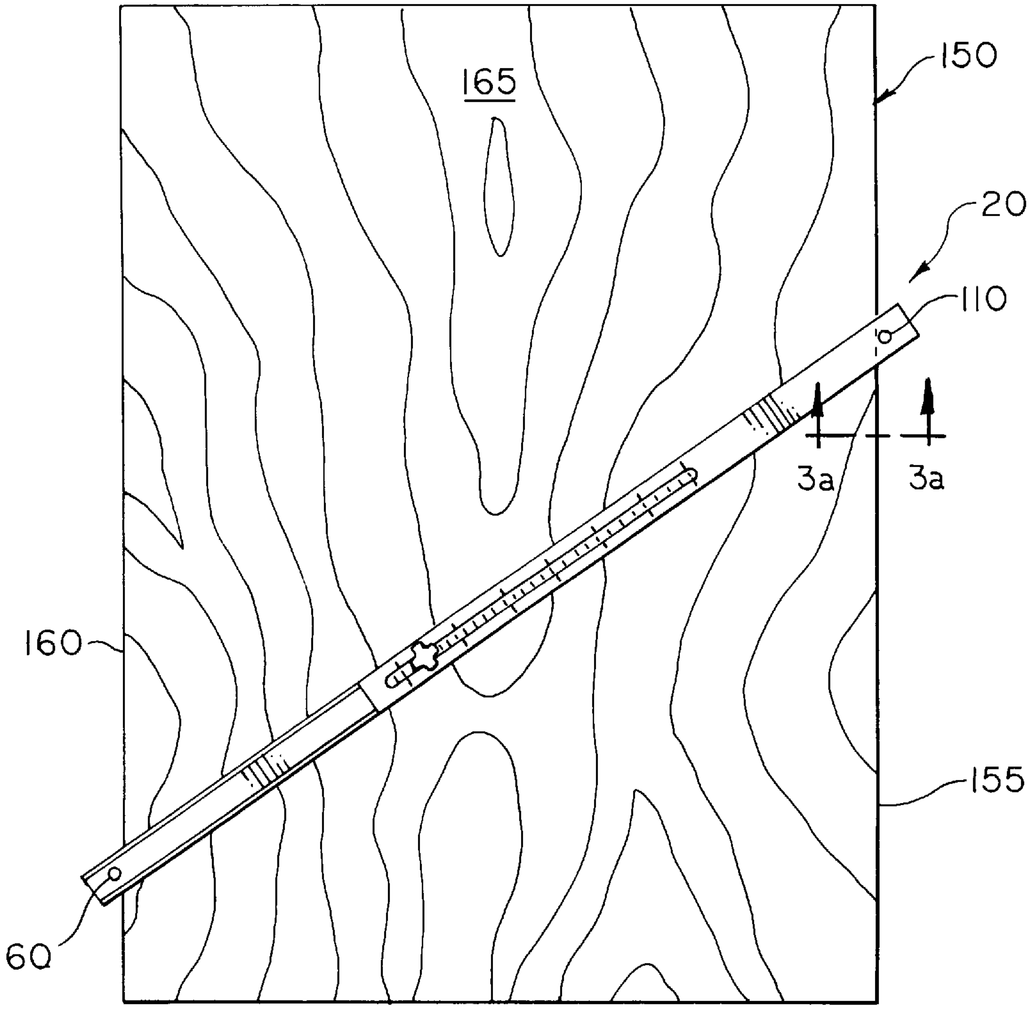
FIG. 3 is a plan view of the device of FIG. 1 operably disposed on a workpiece.

In FIG. 1, an exemplary device of the present invention is indicated generally at 20. Device 20 includes first member 25, second member 30, and locking mechanism 35. First member 25, in turn, displays respective first and second surfaces 40, 45, respective first and second edges 50, 55 and includes exemplary contacting member 60. As best seen in FIG. 2, beveled surface 65 is present proximate each respective first and second edge 50, 55. Exemplary indicia 70 are displayed on first surface 40. In this embodiment, contacting member 60 is seated in first member 25 proximate first end 75. Contacting member 60 depends from second surface 45.

Figure 4:
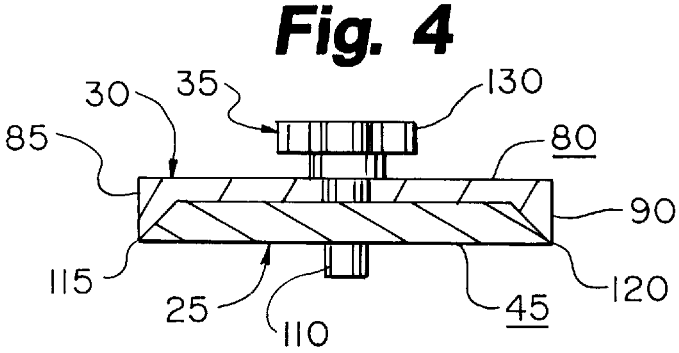
FIG. 4 is a sectional view taken along line 4—4 of FIG. 1.

As seen from FIGS. 1–4, second member 30 displays first surface 80, respective first and second edges 85, 90, respective first and second ends 95, 100 and defines slot 105. Second member 30 also includes contacting member 110. Respective first and second rims 115, 120 are present at tips of edges 85, 90. As best seen in FIGS. 1, 2, edges 50, 55 of first member 25 and respective rims 115, 120 of second member 30 present generally continuous scribing surfaces or edges, the significance of which is discussed below. Indicia 125 are present on surface 80 proximate slot 105. Referring to FIGS. 2, 4, it can be seen that second member 30 is conformed to overlay first member 25 in a sliding relationship.

In this embodiment, exemplary locking mechanism 35 includes head 130 and a depending threaded shaft. The shaft is threadably disposed in first member 25 such that, when locking mechanism 35 is loosened, shaft 135 may reciprocate within slot 105. Locking mechanism 35 functions to hold members 25, 30 in a desired relative position when tightened. Although locking mechanism 35 is described, the person of ordinary skill will appreciate that any number of locking mechanisms would function equally well.

Indicia 70, 125 are marked and disposed such that at least one index is present, for example, on first surface 80. Indicia 70, present on first surface 40 of first member 25, thereby cooperate with indicia 125 such that when selected indicia marks 70, 125 are aligned, a distance between contacting members 60, 110 is defined. The significance of this distance is discussed below.

Operationally, device 20 is used to lay out an angle on a generally planar surface on exemplary workpiece 150 (FIG.

3). Exemplary workpiece 150 displays respective first and second opposite edges 155, 160 and generally planar surface 165. In this embodiment, workpiece 150 is a sheetgood. Specifically, exemplary workpiece 150 is a piece of plywood decking with standard dimensions, such as 4 feet×8 feet. Workpiece 150 may be cut at an angle so as to fit on a roof proximate a hip or valley rafter (or chord) or to conform to a roof slope, when the workpiece is to be used as wall sheathing. Generally, workpiece 150 will be cut at an angle so as to correspond to a geometry for use on a roof of a given pitch. For example, workpiece 150 may be cut to form an angled borderpiece on a hip or gable roof. One specific use of the present invention is fashioning a borderpiece from a standard-sized plywood workpiece 150 to be affixed proximate a hip rafter. A borderpiece (or cut piece) should be considered generally as a piece of decking cut to conform to a hip or valley rafter on a roof or to an exterior wall proximate the roof line on a gable end of a gable roof.

The roof on which workpiece 150 is to be placed will have a known pitch or combination of pitches. Indicia 70, 125 may be spaced and marked such that they are aligned corresponding to the pitch of the roof onto which workpiece 150 is to be installed. Alternatively, any number of standard workpiece sizes may be accommodated by coordinating indicia 70, 125. For example, specific ones of indicia 70 may designate workpiece sizes of 4'×8' and 3'×12'. Specific ones of indicia 125 may designate differing pitches and differing combinations of pitches. Combinations of pitches are necessary where portions of a roof are constructed with differing pitches. Appropriate marks from indicia 70, 125 are aligned by sliding first member 25 relative to second member 30. Once first member 25 and second member 30 are aligned, locking mechanism 35 is used to lock first member 25 and second member 30 in the desired position. Contacting members 60, 110 are then at the proper distance for laying out a desired angle on workpiece 150. A desired length is measured on edge 155 and marked. Device 20 is then positioned on workpiece 150 such that contacting members 60, 110 contact respective edges 160 and 155 such that either edge 115 or edge 120 contacts the mark. Device 20 is then held in place with contacting members 60, 110 firmly in contact with respective edges 160, 155, and a mark is scribed along edges 115, 50 or 120, 55. Thus, an angle from edge 155 or from edge 160 has been scribed. Device 20 is then removed, and workpiece 150 is then cut along the scribed line and may now be installed on the roof.

Figures 10, 11, 12:
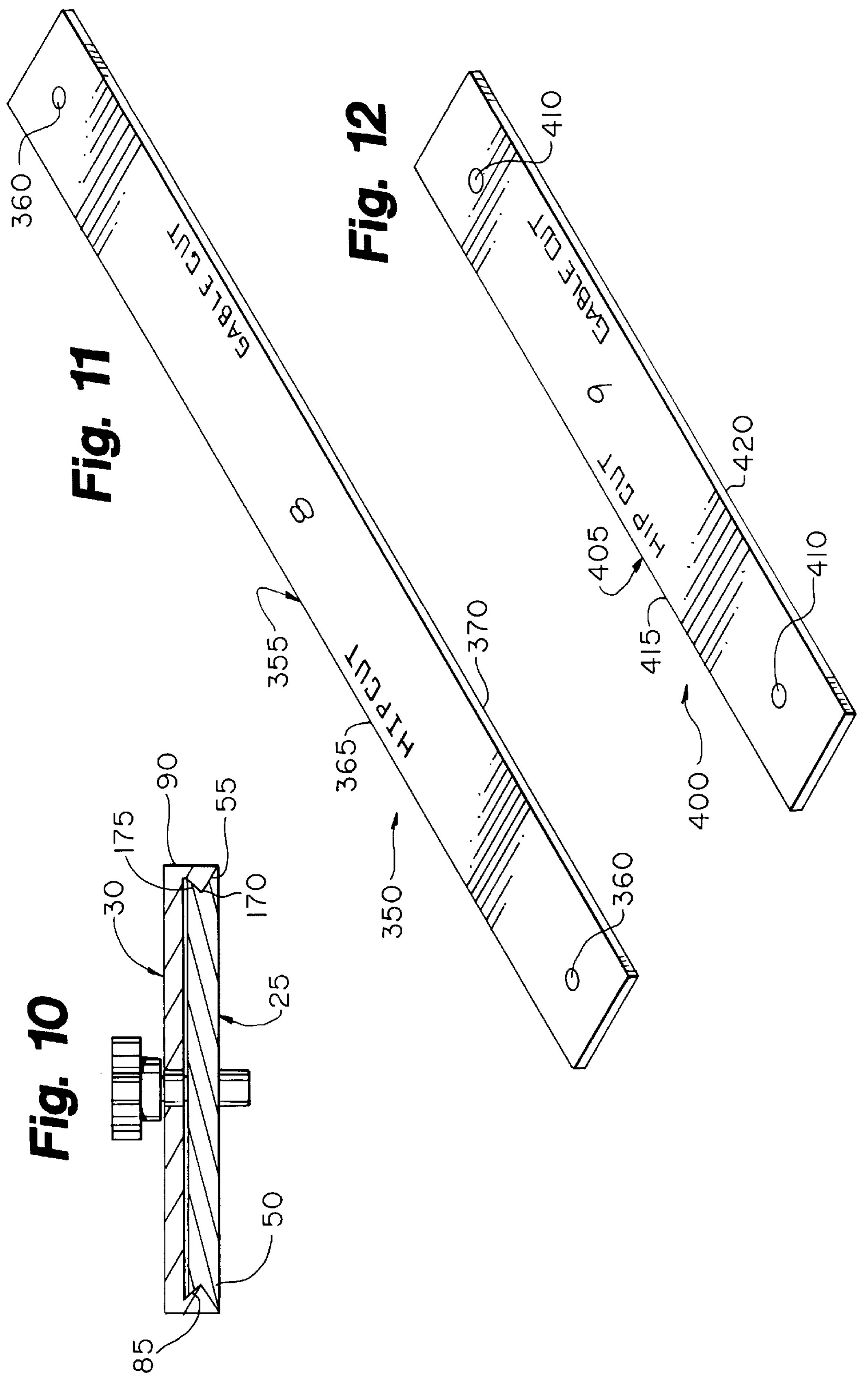
FIG. 10 is a sectional view taken along line 10—10 of FIG. 1 of an alternate embodiment thereof.
FIG. 11 is a perspective view of an alternate embodiment of the device of FIG. 1.
FIG. 12 is a perspective view of an alternate embodiment of the device of FIG. 11.

An alternative method of cooperation between first member 25 and second member 30 is illustrated in FIG. 10. In this alternative embodiment, a V-notch 170 is defined in first member 25, proximate respective first and second edges 50, 55. A complementary V-shaped extension (or lip) 175 is present proximate respective first and second edges 85, 90 and disposes within each V-notch 170. The presence of V-notch 170 and V-shaped extension 175 allows first member 25 to slide within second member 30, but prevents vertical separation between respective first and second members 25, 30.

Figure 6:
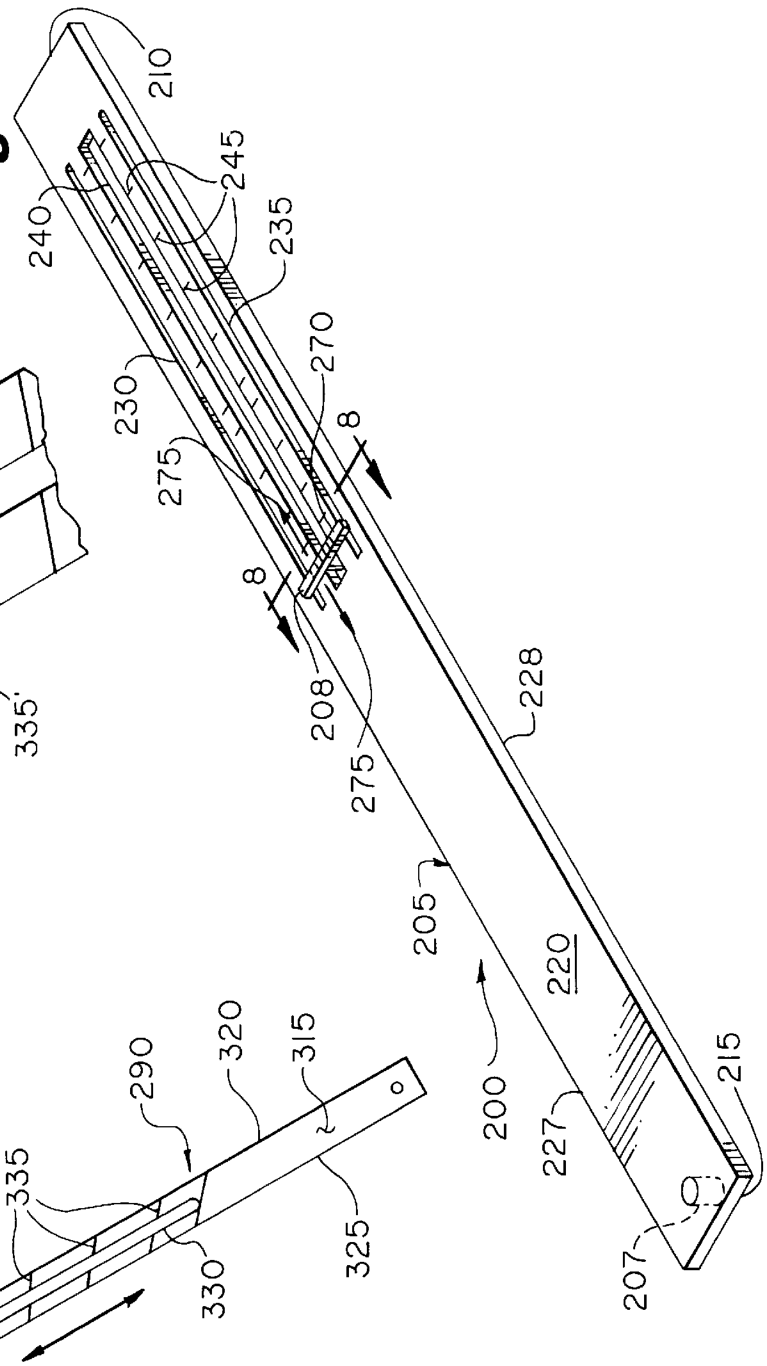
FIG. 6 is a perspective view of another alternate embodiment of the device of FIG. 1.
Figure 7:
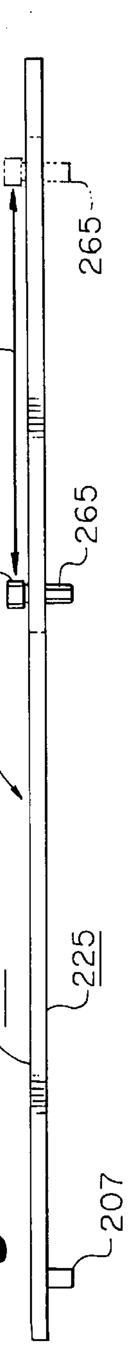
FIG. 7 is a side view of the device of FIG. 6.
Figure 8:
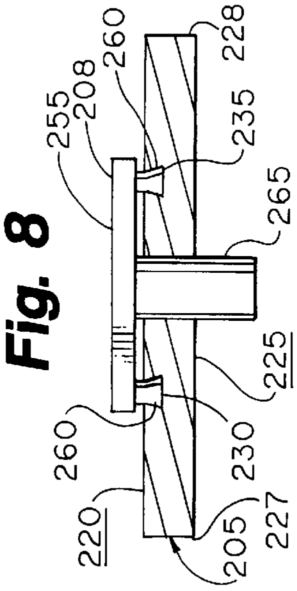
FIG. 8 is a cross-sectional view taken along line 8—8 of FIG. 6.

An alternate embodiment is depicted in FIGS. 6–9 generally as device 200. Device 200 includes unitary member 205 and respective contacting members 207, 208. Unitary member 205 displays respective first and second ends 210, 215, respective first and second surfaces 220, 225, respective first and second edges 227, 228, and defines one or more slots 230, 235, 240. Slots 230, 235 flank slot 240. Indicia 245 are present on first surface 220, proximate slot 240. Contacting member 207 is disposed proximate distal end 15 and extends below second surface 225 as best seen in FIGS. 6 and 7. Referring to FIGS. 6, 8, contacting member 208 includes cross member 255, a pair of extensions 260, and contacting element 265. Extensions 260 are affixed to a lower surface of cross member 255 and are spaced apart such as to dispose in slots 230, 235. Contacting element 265 extends from the lower surface of cross member 255 through slot 240. Contacting element 265 is of a length such that contacting element 265 extends past lower surface 225. Cross member 255 also displays edge 270. Indicia 245 are spaced and marked so that when edge 270 aligns with a given indicia mark, a distance is established between contacting member 207 and contacting element 265, thereby enabling an angle to be inscribed on a workpiece.

Figure 9:
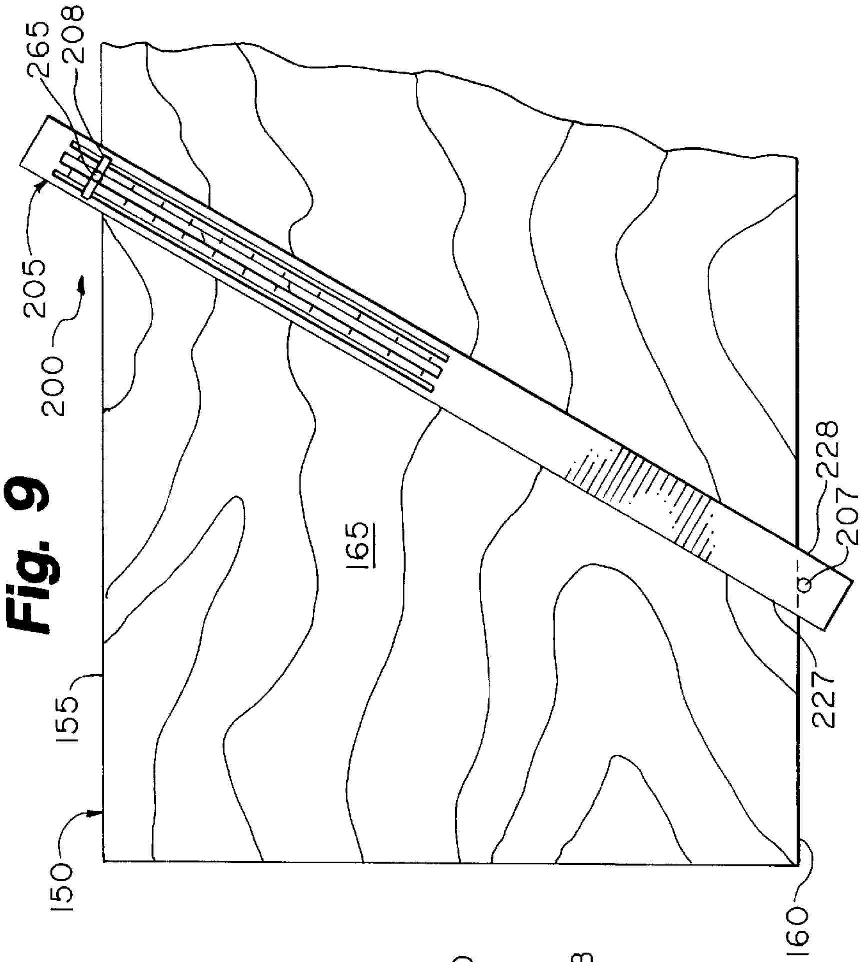
FIG. 9 is a plan view of the device of FIG. 6 operationally disposed on a workpiece.

Referring to FIGS. 6 and 9, a desired distance has been measured along edge 155 of workpiece 150 and marked. Contacting member 208 has been adjusted in one of the directions of arrows 275 until proximal edge 270 aligns with a desired indicia mark 245. Contacting member 208 may then be reversibly locked to unitary member 205 by any of several means known to the art. Device 200 is then placed on surface 165 such that contacting member 207 and contacting element 265 contact respective edges 160, 155. Either of edges 227, 228 are aligned with the previously measured mark, and a line is scribed on surface 165 using aligned edges 227, 228. Device 200 is then removed from workpiece 155 and workpiece 155 is then cut along the inscribed line. Workpiece 155 has thusly been cut at the desired angle for the pitch of the roof onto which workpiece 155 will emplaced.

Figure 5A:
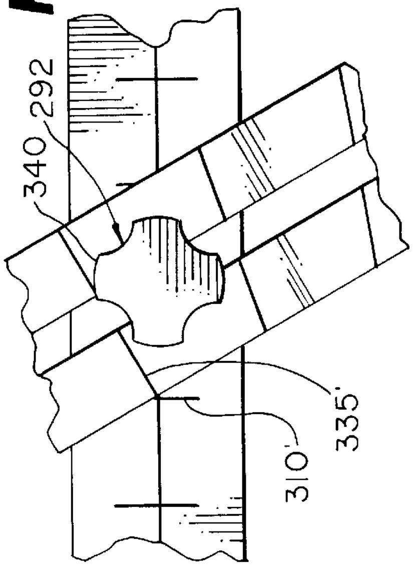
FIG. 5*a* is a fragmentary plan view of the area indicated in FIG. 5.
Figure 5:
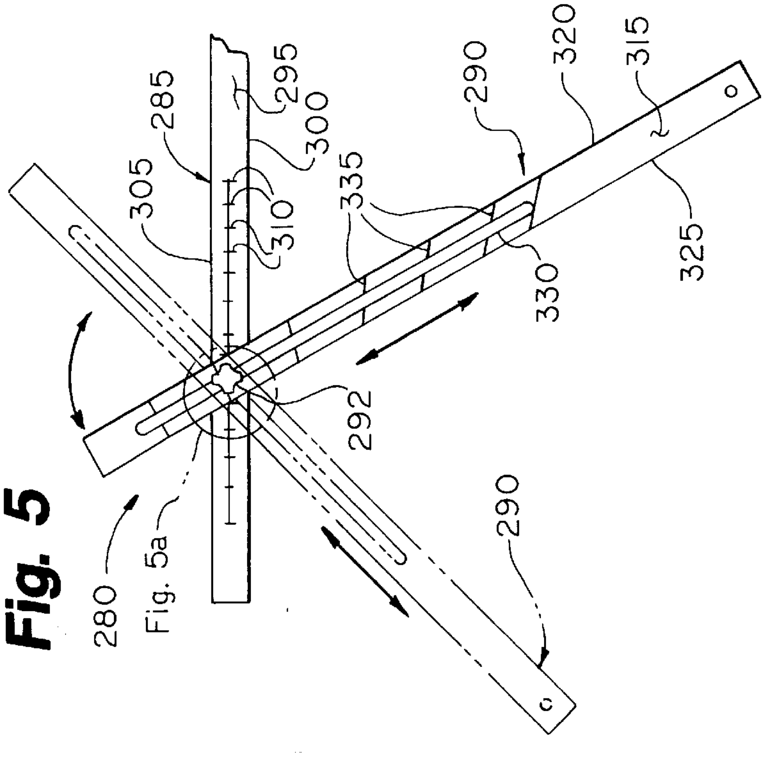
FIG. 5 is a plan view of an alternate embodiment of the device of FIG. 1.

Another alternative embodiment is displayed in FIGS. 5, 5*a* generally as device 280. Device 280 includes respective first and second members 285, 290 and locking mechanism 292. First member 285, in turn, displays first surface 295 and respective first and second edges 300, 305. Indicia 310 are present on first surface 295.

Second member 290, in turn, displays first surface 315, respective first and second edges 320, 325 and defines slot 330. Indicia 335 are present on first surface 315. Locking mechanism 292 may be similar to locking mechanism 35 and includes a threaded portion (not shown) and head 340. The threaded portion of locking mechanism 292 is threadably received in first member 285 and extends through slot 330. As best seen in FIG. 5*a*, an appropriate angle is laid out by aligning indicia 310, 335. In this example, indicia 310', 335' are brought into contact. Indicia 310', 335' are ideally labeled to enable an angle to be formed for a given roof pitch on a standard-dimension workpiece such as workpiece 150.

Referring to FIG. 11, still another embodiment is depicted generally as unitary device 350. Unitary device 350 includes member 355 and a plurality of contact elements 360. Member 355 displays respective first and second edges 365, 370. Contact elements 360 are disposed proximate the ends of member 355. Unitary device 350 is intended to enable the user to inscribe desired angles on workpiece to be installed on roofs of only a single pitch or a single combination of pitches. Contact elements 360 are situated generally centrally to edges 365, 370. Contact elements 360 are disposed a distance apart such that hip cuts are enabled for an 8/12 pitch in this embodiment.

Referring to FIG. 12, yet another embodiment is depicted as generally unitary device 400. Device 400 includes member 405 and a plurality of contact elements 410. Member 405 displays respective first and second edges 415, 420. Similarly to device 350, device 400 is intended for use on roofs of only a single pitch or combination of pitches. In this case, device 400 enables gable cuts for roofs with a 9/12 pitch.

Materials used to make any of the devices discussed and described herein include aluminum, steel, various metal alloys, and synthetic resins, as well as others known to the art.

Numerous modifications of this invention may be made without departing from its spirit. Thus, the scope of the invention is not to be limited to the embodiments illustrated and described, but is to be determined by appended claims and their equivalents.

What is claimed is:

1. A device for laying out one of a first angle, and a second angle on a generally planar surface of a standard workpiece with generally opposite first and second edges, each angle extending from the first edge of the workpiece such that the workpiece corresponds to a geometry for a borderpiece on a roof when the workpiece is cut along the angle, the device comprising:

a first member;

a second member in sliding contact with the first member, the first and second members cooperating to form a continuous, linear scribing edge when either of the first and second angles are being laid out; and a contact assembly including first and second contact elements extending from lower surfaces of the respective first and second members, the contact assembly cooperating with the first member and the second member such that the scribing edge is disposed to define one of the first and second angles when the first and second edges of the workpiece are contacted by the contact elements.

2. The device of claim 1, in which first and second indicia sets are present on respective first and second members, a first indicium from the first indicia set aligning with a first indicium from the second indicia set to define a first distance between the contact elements for a first roof pitch and a second indicium from the first indicia set aligning with a second indicium from the second indicia set to define a second distance between the contact elements for a second roof pitch, the first and second distances corresponding to respective first and second roof pitches.

3. The device of claim 2, in which the second member defines a slot, the indicia present on the second member disposed proximate the slot, the first and second indicia present on the first member disposed so as to be viewable through the slot.

4. The device of claim 3, further comprising a locking mechanism reversibly locking the first and second members into respective first and second positions, conforming to respective first and second roof pitches.

5. The device of claim 4, the locking mechanism comprising a threaded portion disposable in the first member and extendable through the slot.

6. A method of defining and forming a borderpiece from a standard workpiece using a device for laying out one of a first angle and a second angle on a generally planar surface of the workpiece, the device including:

first and second members and a locking mechanism, the first and second members in a sliding and adjustable relation, cooperating to form a continuous, linear scribing edge when either of the first and second angles are being laid out, and including a contact element extending from each of first and second member lower surfaces, the first and second members adjustable to either of a first position corresponding to the first angle by aligning an indicium on the first member with a indicium on the second member or a second position corresponding to the second angle by aligning the indicium on the first member with another indicium on the second member, the first and second members being reversibly locked into the first and second positions by operating the locking mechanism, the method comprising the steps of:

providing the device;

adjusting the device to the first position;

contacting the contacting elements on the first and second members to opposite and respective first and second edges on the workpiece; and scribing a line on a surface of the workpiece proximate the scribing edge.

7. The method of claim 6, further comprising the step of cutting the workpiece along the scribed line, thereby forming the borderpiece for a roof with a first pitch.

8. The method of claim 6, in which the device is adjusted to the second position, thereby forming the borderpiece for a roof with a second pitch.

9. The method of claim 6, in which first and second scribing edges are displayed by the device and in which the line is scribed on the surface of the workpiece proximate the first scribing edge.

10. The method of claim 9, in which the line is scribed on the surface of the workpiece proximate the second scribing edge.

11. The method of claim 9, in which the borderpiece is formed for a hip roof.

12. The method of claim 9, in which the borderpiece is formed for a gable roof.

* * * * *